(12) United States Patent
Rudisill

(10) Patent No.: US 6,816,721 B1
(45) Date of Patent: Nov. 9, 2004

(54) SYSTEM AND METHOD OF PURCHASING PRODUCTS AND SERVICES USING PREPAID WIRELESS COMMUNICATIONS SERVICES ACCOUNT

(75) Inventor: Luther Rudisill, Parker, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/543,630

(22) Filed: Apr. 5, 2000

(51) Int. Cl.$^7$ .............................................. H04Q 7/08
(52) U.S. Cl. .................... 455/406; 455/408; 705/40
(58) Field of Search ............................... 455/406, 405, 455/407–408, 414.1, 403; 705/40, 44, 39; 379/114.03, 144.01, 114.26, 114.28

(56) References Cited

U.S. PATENT DOCUMENTS

| | | | |
|---|---|---|---|
| 5,359,182 A | 10/1994 | Schilling | 235/380 |
| 5,359,642 A | 10/1994 | Castro | 379/121 |
| 5,371,493 A | 12/1994 | Sharpe et al. | 340/825 |
| 5,577,100 A | 11/1996 | McGregor et al. | 379/58 |
| 5,592,535 A * | 1/1997 | Klotz | 379/58 |
| 5,722,067 A | 2/1998 | Fougnies et al. | 455/406 |
| 5,740,247 A | 4/1998 | Violante et al. | 380/24 |
| 5,748,720 A | 5/1998 | Loder | 379/144 |
| 5,778,313 A | 7/1998 | Fougnies | 455/406 |
| 5,812,945 A | 9/1998 | Hansen et al. | 455/403 |
| 5,826,185 A | 10/1998 | Wise et al. | 455/405 |
| 5,850,599 A * | 12/1998 | Seiderman | 455/406 |
| 5,854,975 A | 12/1998 | Fougnies et al. | 455/408 |
| 5,909,485 A | 6/1999 | Martin et al. | 379/144 |
| 5,991,749 A * | 11/1999 | Morrill, Jr. | 705/44 |
| 6,070,067 A * | 5/2000 | Nguyen et al. | 455/407 |
| 6,098,053 A * | 8/2000 | Slater | 705/44 |
| 6,185,545 B1 * | 2/2001 | Resnick | 705/40 |
| 6,195,542 B1 * | 2/2001 | Griffith | 455/406 |
| 6,236,851 B1 * | 5/2001 | Fougnies et al. | 455/408 |
| 6,424,706 B1 * | 7/2002 | Katz et al. | 379/144.01 |
| 6,535,726 B1 * | 3/2003 | Johnson | 455/406 |

* cited by examiner

Primary Examiner—William Trost
Assistant Examiner—Brandon J. Miller
(74) Attorney, Agent, or Firm—Haynes and Boone, LLP

(57) ABSTRACT

System and method for enabling the purchase of products and services using a prepaid account associated with a wireless communications device are described. In a preferred embodiment, when a subscriber desires to pay for a transaction using a prepaid wireless communications services ("PWCS") account associated with a wireless communications device, a telephone number of the device and the transaction amount are entered using a keypad of a card reader. The information is routed through a financial institution to a financial clearing house network based on the telephone number. The data is then routed through a financial interface of a wireless communications network to a service control point ("SCP") containing the subscriber record associated with the telephone number. At the SCP, a determination is made whether there are sufficient funds in the subscriber's prepaid account to cover the amount of the transaction. If so, the transaction is allowed and the subscriber's account is debited in the amount of the purchase. Otherwise, the transaction is denied and the merchant is notified. In one aspect, before the PWCS account is debited, a short message service center ("SMSC") connected to the SCP generates a message to the wireless communications device to obtain authorization of the transaction. An additional level of security may be provided by requiring the subscriber to enter a PIN number prior to allowing him or her to authorize or reject the transaction.

14 Claims, 1 Drawing Sheet

US 6,816,721 B1

SYSTEM AND METHOD OF PURCHASING PRODUCTS AND SERVICES USING PREPAID WIRELESS COMMUNICATIONS SERVICES ACCOUNT

TECHNICAL FIELD

The invention relates generally to prepaid wireless communications services accounts and, more particularly, to a system and method of purchasing products and services using a prepaid wireless communications services account.

BACKGROUND OF THE INVENTION

In a conventional wireless communications network, such as a GSM network, service subscribers are often charged for services used via a settlement account assigned to the subscriber. At predetermined time intervals, e.g., monthly, the balance of a subscriber's settlement account is determined and a corresponding bill sent to the subscriber.

A variant of the above-described scenario involves the use of prepaid accounts. In this scenario, instead of a settlement account, a debit account is opened and assigned to a subscriber as identified by a subscriber profile. In operation, incoming calls from prepaid wireless communications services ("PWCS") subscribers are selected and switched by a mobile switching center ("MSC"). For each such call, a connection is established if the subscriber's debit account contains a predetermined minimum balance. Within a service control point ("SCP"), the switched call is charged by deducting a predetermined unit (e.g., "per minute") fee from the debit account. A service switching point ("SSP") releases the connection if the debit account fails to have a positive balance at any time during the call. Typically, a financial interface will be provided between the SCP and a financial clearing house network for enabling credit card recharging of the prepaid account.

It is conceivable that there will be occasions in which a PWCS subscriber would want to purchase a product or service other than a wireless communications service at a time at which he or she is in possession of a wireless communications device, such as a cellular telephone, having a prepaid account associated therewith, but not a calling card, debit card, cash, or other means of payment.

Therefore, what is needed is a system and method for enabling a PWCS subscriber to use a prepaid account associated with a wireless communications device to purchase products or services other than wireless communications services.

SUMMARY OF THE INVENTION

Accordingly, system and method for enabling products and services to be purchased using a prepaid account assigned to a wireless communications services subscriber and associated with a wireless communications device is disclosed herein. In a preferred embodiment, a telephone number of a wireless communications device, such as a cellular telephone, having a prepaid account associated therewith is entered using a keypad of a conventional magnetic stripe card reader. The amount of the purchase, as well as a merchant ID, are entered in the same fashion. The entered information is forwarded to a financial institution, which routes the information to a financial clearing house network according to the telephone number. The financial clearing house network routes the data through a financial interface of a wireless communications network to a service control point ("SCP") containing the subscriber record associated with the telephone number. At the SCP, a determination is made whether there are sufficient funds in the subscriber's prepaid account to cover the amount of the purchase. If so, the transaction is allowed and the subscriber's account is debited in the amount of the purchase. Otherwise, the transaction is denied and the merchant is notified of the denial in a conventional fashion.

In one aspect, before the subscriber's prepaid account is debited in the amount of the purchase, a short message service center ("SMSC") connected to the SCP generates a message to the wireless communications device to obtain subscriber verification and authorization of the transaction. For example, the purchase price may be displayed and the subscriber prompted to "Press 1" to authorize the transaction or to "Press 2" to reject the transaction. Moreover, an additional level of security may be provided by requiring the subscriber to enter a personal identification number ("PIN") prior to permitting him or her to authorize or reject the transaction.

A technical advantage achieved with the invention is that it enables prepaid wireless communications services subscribers to pay for products and/or services in circumstances in which they might not otherwise be able to purchase them.

DESCRIPTION OF THE PREFERRED EMBODIMENT

Figure 1:
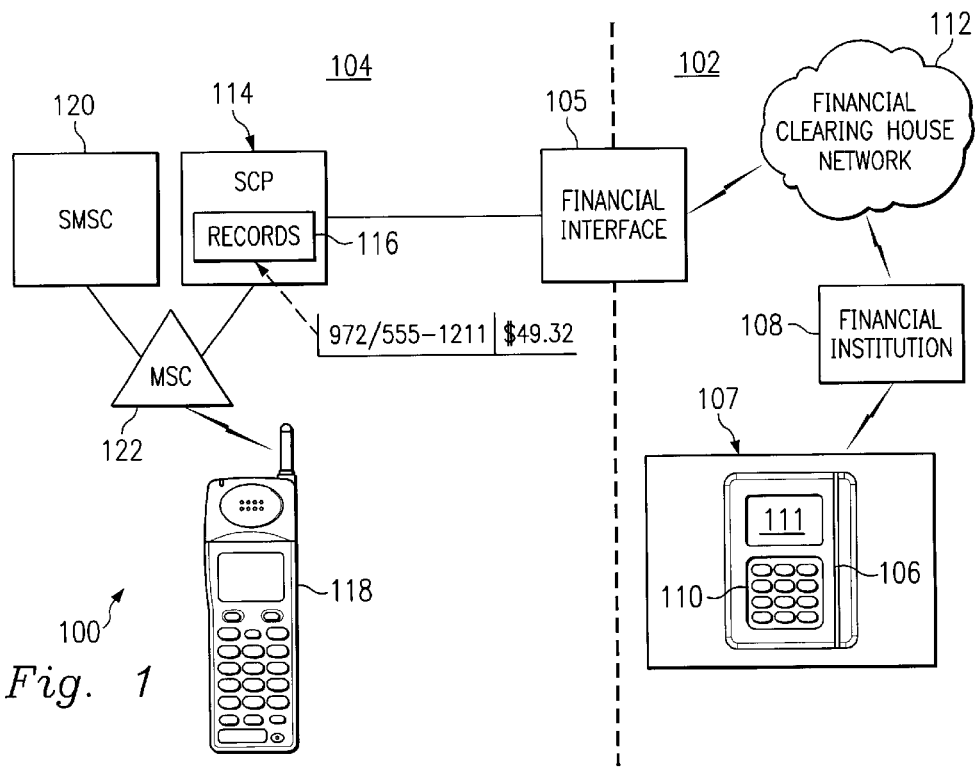
FIG. 1 is a system block diagram of a preferred embodiment of the system of the present invention.

Referring to FIG. 1, a system for purchasing products and services using a prepaid wireless communications services account is designated by a reference numeral 100. As shown in FIG. 1, the system 100 comprises a banking portion 102 and a telecommunications portion 104 connected to one another via a financial interface 105. The banking portion 102 comprises at least one device located at a merchant's or service provider's place of business 107 (the point-of-sale) and connected to a financial institution 108. In a preferred embodiment, the device includes a card reader 106 and a keypad 110 for inputting numerical and other data to be sent to the financial institution 108 and a display 111 for displaying information entered using the keypad 110, as well as information received via the financial my institution 108. The financial institution 108 is connected to a financial clearing house ("FCH") network 112 in a conventional fashion. The FCH network 112 handles debit and credit card transactions in a manner that is well known in the art.

The telecommunications portion 104, which is maintained by a provider of PWCS ("PWCS provider"), includes a service control point ("SCP") 114 that maintains a plurality of PWCS subscriber records 116, each of which includes the telephone number of a wireless communications device, such as a device 118, and the amount remaining in the prepaid account associated with the device. The device 118 is connected to the SCP, as well as to a short message service center ("SMSC") 120, via a mobile switching center ("MSC") 122 for purposes that will be described in detail below.

Figure 2:
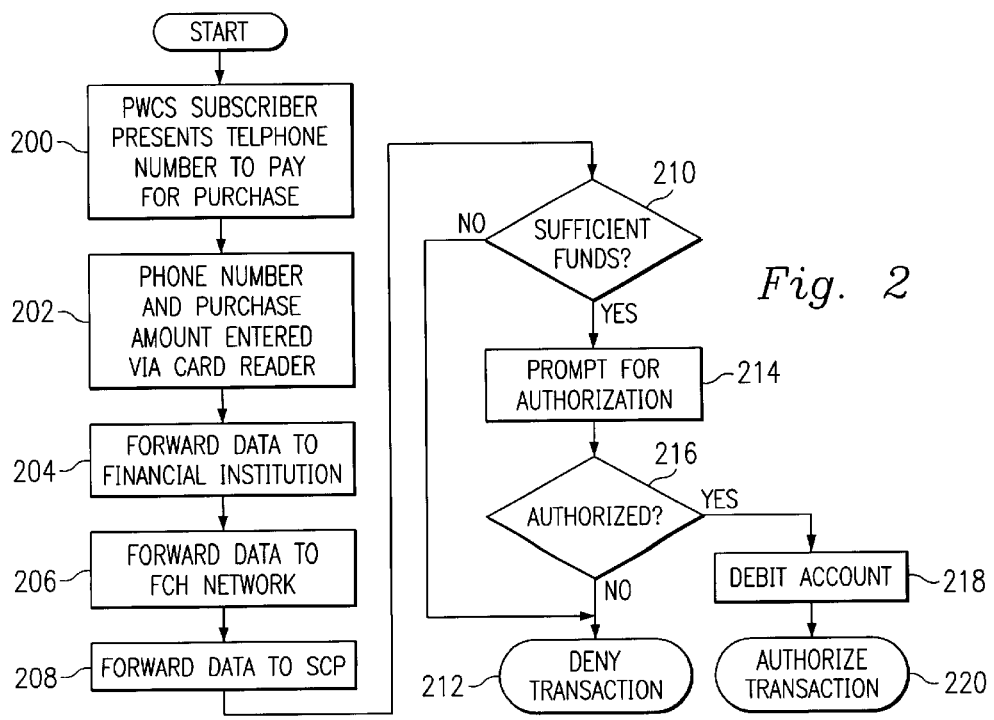
FIG. 2 is a flowchart of the operation of the system of FIG. 1.

FIG. 2 is a flowchart of the operation of the system 100 of FIG. 1. In step 200, a PWCS subscriber desirous of purchasing a product or service from the business 107 using a prepaid account associated with the wireless communications device 118 conveys the telephone number of the device to an employee of the business. In step 202, the employee enters the provided telephone number, as well as the purchase amount and merchant ID, using the keypad 110 of the device. In step 204, the entered information is forwarded to the financial institution 108, which routes the information to the FCH network 112 in step 206. In step 208, the FCH network 112 routes the information through the financial interface 105 to the SCP 114. In step 210, the SCP 114 accesses the particular record associated with the device 118 from the PWCS subscriber records 116 and determines whether sufficient funds exist in the debit account to cover the transaction and maintain a predetermined minimum balance, if applicable. If not, execution proceeds to step 212, in which the transaction is denied and notification to that effect is provided to the merchant on the display 111 of the point of sale device via the financial interface 105, the FCH network 112, and bank 108.

If in step 210 it is determined that sufficient funds do exist, execution proceeds to step 214, in which the subscriber is prompted for authorization of the transaction. In a preferred embodiment, this is accomplished using the SMSC 120 to display on a display of the wireless communications device 118 a message informing the subscriber of the purchase price for the transaction and prompting the subscriber to press a first key, e.g., "1", to authorize the transaction and a second key, e.g., "2", to refuse the transaction. In step 216, a determination is made as to whether the subscriber has authorized the transaction. If not, execution proceeds to step 212 and the transaction is denied as described above; otherwise, execution proceeds to step 218, in which the account is debited in the amount of the transaction, plus a transaction fee, if applicable. The transaction fee comprises one or more small fees respectively charged by the wireless communications services network provider, the merchant, and/or the financial institution 108. Execution then proceeds to step 220, in which authorization of the transaction is returned to the merchant.

Once the transaction is completed, the FCH network 112 posts the transaction to a daily settlement log maintained by the network. At the end of the business day, the accounts are "settled" by the FCH network 112 debiting the bank account of the PWCS subscriber and crediting the bank account of the merchant. The foregoing assumes, as must be the case, that the PWCS subscriber has registered with the FCH network 112 and established the proper accounts, such as is required for conventional debit card accounts. In particular, the PWCS subscriber must identify to the FCH network 112 from what bank account to draw the funds to cover the transactions and ensure that the funds are available in the identified account. For each transaction completed for the PWCS subscriber, the FCH network 112 electronically debits the identified account in the amount of the transaction and posts that amount to the preferred bank account of the merchant identified by the merchant ID provided in connection with the transaction. In practice, the transactions for a particular PWCS subscriber are aggregated to save time. The fee for this service is included as part of the transaction fee, discussed above. As previously indicated, this process is similar to that used in connection with conventional debit cards.

It will be recognized that appropriate program code executable by a processor (not shown) of the SCP 114 will be included in the SCP for implementing steps 210–220 described above.

Accordingly, the system 100 as described herein enables a subscriber having a prepaid wireless communications services account with a wireless communications services provider to purchase products and services using that account.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of paying a seller for a purchase transaction using a prepaid account associated with a wireless communications device, the method comprising:

receiving transaction information comprising a telephone number of the wireless communications device and a purchase amount by a device at a point-of-sale;

receiving the transaction information at a service control point ("SCP") of a wireless communications network communicatively coupled to the point of sale device, the SCP maintaining a record identified by the telephone number indicating an account balance of the prepaid account;

determining whether the account balance is sufficient to cover the transaction;

responsive to a determination that the account balance is not sufficient to cover the transaction, denying the transaction;

responsive to a determination that the account balance is sufficient to cover the transaction, deducting a transaction amount from the account balance and sending a message to indicate a crediting of an account of the seller such that the seller is then paid for the purchase.

2. The method of claim 1 further comprising, responsive to a determination that the account balance is sufficient to cover the transaction and prior to the deducting, prompting the PWCS subscriber for authorization.

3. The method of claim 2 further comprising, responsive to a determination that the account balance is sufficient to cover the transaction and prior to the prompting, requiring the PWCS subscriber to enter a personal identification number ("PIN").

4. The method of claim 1 wherein receiving transaction information further comprises:

receiving the transaction information via a keypad of the point of sale device communicatively coupled to a financial institution;

the financial institution routing the transaction information to the SCP via a financial clearing house network and a financial interface.

5. The method of claim 2 wherein prompting, for authorization comprises a short message service center ("SMSC") sending text messages to the wireless communications device for presentation on a display thereof.

6. The method of claim 1 wherein the transaction amount includes the purchase amount and a transaction fee.

7. The method of claim 1 wherein the transaction information further includes a merchant ID identifying a seller in connection with the purchase transaction.

8. A system of paying a seller for a purchase transaction using a prepaid account associated with a wireless communications device, the system comprising:

means for receiving, at a service control point ("SCP"), transaction information comprising a telephone number of the wireless communications device and a purchase amount obtained by a point of sale device, the SCP maintaining a record identified by the telephone number indicating an account balance of the prepaid account;

means for determining whether the account balance is sufficient to cover the transaction;

means responsive to a determination that the account balance is not sufficient to cover the transaction for denying the transaction;

means responsive to a determination that the account balance is sufficient to cover the transaction for deducting a transaction amount from the account balance and sending a message to indicate a crediting of an account of the seller such that the seller is then paid for the purchase.

9. The system of claim 8 further comprising means responsive to a determination that the account balance is sufficient to cover the transaction for prompting the PWCS subscriber for authorization prior to the deducting.

10. The system of claim 9 further comprising means responsive to a determination that the account balance is sufficient to cover the transaction for requiring the PWCS subscriber to enter a personal identification number ("PIN") prior to the prompting.

11. The system of claim 9 wherein the means for prompting comprises a short message service center ("SMSC") for sending text messages to the wireless communications device for presentation on a display thereof.

12. The system of claim 8 wherein the transaction amount includes the purchase amount and a transaction fee.

13. The system of claim 8 wherein the transaction information further includes a merchant ID identifying a seller in connection with the purchase transaction.

14. A method of a payment transaction comprising:

receiving, at a service control point, transaction information comprising a number associated with a wireless communications device and a purchase amount obtained at a point of sale device;

determining whether a balance of an account associated with the number of the wireless communications device is sufficient to cover at least the purchase amount;

sending a deny message to the point of sale device in response to a determination that the account balance is not sufficient to cover at least the purchase amount;

sending a prompt for authorization to the wireless communications device in response to a determination that the account balance is sufficient to cover at least the purchase amount; and sending a message to the point of sale device indicative of authorization of the payment transaction in response to receiving prompted authorization.

* * * * *